Jan. 18, 1966 J. R. BROWN, JR 3,229,825
HOGSHEAD CRADLE

Filed March 6, 1964 2 Sheets-Sheet 1

INVENTOR,
JOHN R. BROWN, JR.

BY Watson, Cole, Grindle & Watson
ATTORNEYS

Jan. 18, 1966    J. R. BROWN, JR    3,229,825
HOGSHEAD CRADLE
Filed March 6, 1964    2 Sheets-Sheet 2
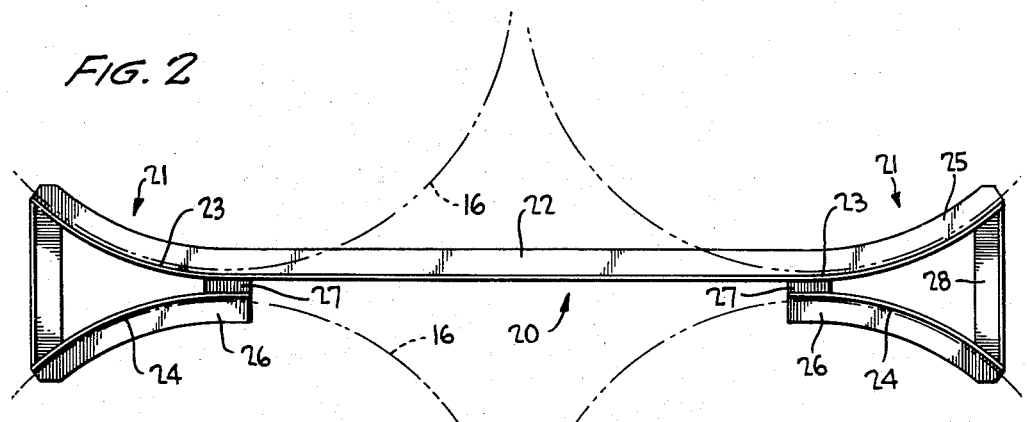
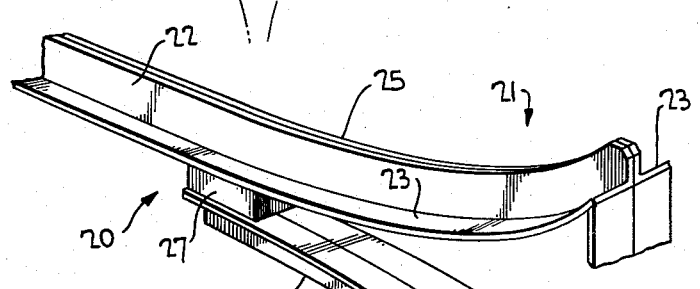
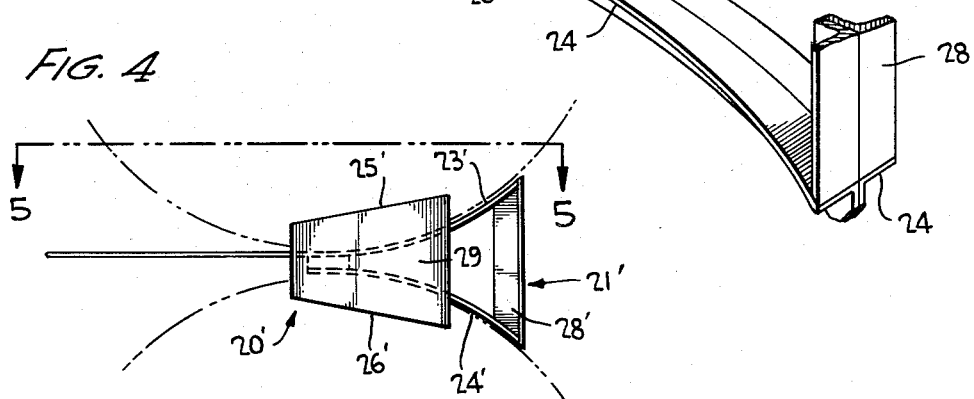
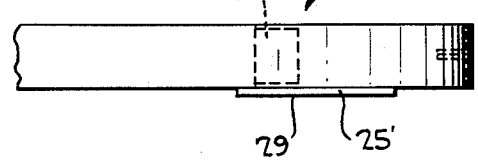
INVENTOR,
JOHN R. BROWN, JR.
BY Watson, Cole, Grindle & Watson
ATTORNEYS United States Patent Office 3,229,825
Patented Jan. 18, 1966

3,229,825
HOGSHEAD CRADLE
John R. Brown, Jr., 301 Country Club Drive,
Greensboro, N.C.
Filed Mar. 6, 1964, Ser. No. 350,061
6 Claims. (Cl. 214—10.5)

This invention relates to improvements in a cradle structure for use in securing a load of generally cylindrical objects such as hogheads on a vehicle body in a manner to enable the said body to accommodate a maximum load and to securely maintain said load against shifting or rolling. The invention also includes the assemblage of such cradles with the hogshead or other cylindrical objects on the flat load carrying bed of a vehicle to provide a novel package or load arrangement.

In transporting hogsheads of tobacco, it has been customary heretofore to load such hogsheads onto the vehicle in pyramidal formation, that is with two rows of axially aligned hogsheads resting on and extending lengthwise of the vehicle bed or body and chocked against rolling movement thereon, and a third similarly aligned row of hogsheads supported or cradled in the valley between the lower said rows.

In accordance with the present invention there is provided a novel cradle, of which a plurality are employed for simultaneous coaction with upper and lower rows of hogsheads to maintain the said hogsheads of the upper and lower rows respectively in vertically superimposed relationship and against rolling. By thus making possible the transporting of an additional row of hogsheads in each load, the invention permits a substantial increase in the size of load which may be transported without danger of shifting and thus contributes substantially to the economical transportation of the particular goods involved.

In accordance with an important feature of the invention, each of the cradles simultaneously coacts with a plurality of lower hogsheads and a plurality of upper hogsheads, by utilizing the weight of the latter, for urging the relatively laterally adjoining lower hogsheads into frictional peripheral engagement to secure them against rolling movement.

A further feature of importance consists of the provision of a vertical flange or divider on each cradle for endwise abutting engagement with the associated hogsheads to thus accurately position the hogsheads and cradles so that the hogsheads are secured against relative axial shifting. Moreover, where such a cradle is employed in combination with usual wooden hogsheads such as are employed in transporting tobacco, such flange or flanges serve to accurately position the cradle for operative engagement with the steel rims or hoops which encircle and reinforce the respective ends of each hogshead. This avoids risk of damage such as might occur where the hogshead is engaged directly by its wooden staves.

Further in accordance with the invention each of the cradles which is in an intermediate position of the load or in other words adapted for coaction with the relatively adjoining ends of hogsheads in different rows is provided with vertical flanges or dividers extending both upwardly and downwardly from its chocking or supporting surfaces for reception between adjoining hogshead ends, the said flanges or dividers bisecting these supporting surfaces whereby the surface portions on opposite sides thereof may support the adjoining ends of different hogsheads in axially aligned rows. Moreover the said dividers or flanges maintain a predetermined space between adjoining ends of adjacent hogsheads through which guy lines or anchoring lines may extend from the respective cradles to suitable anchoring points on the truck body, without being subjected to pinching or severing between the hogsheads ends.

The aforegoing and other incidental features and advantages will be made apparent by reference to the accompanying drawings and detailed description of a preferred embodiment of the invention. It is to be understood that such specific embodiment is disclosed merely by way of exemplification and not by way of limitation of the invention.

In the accompanying drawings:

FIGURE 2 is a side elevation of one of the cradles in a form adapted for use between the ends of relatively adjoining hogsheads, a plurality of such hogsheads being shown fragmentarily in broken lines to indicate the manner of their cooperation with the cradle.

FIGURE 3 is a view of one end portion of such a cradle with a portion thereof broken away to provide a better view of certain structural details.

FIGURE 4 is a fragmentary side elevation of a cradle as modified for use only at one end or the other of the load; and FIGURE 5 is a plan view of the structure shown in FIGURE 4 as seen from line 5—5 in FIGURE 4.

Figure 1:
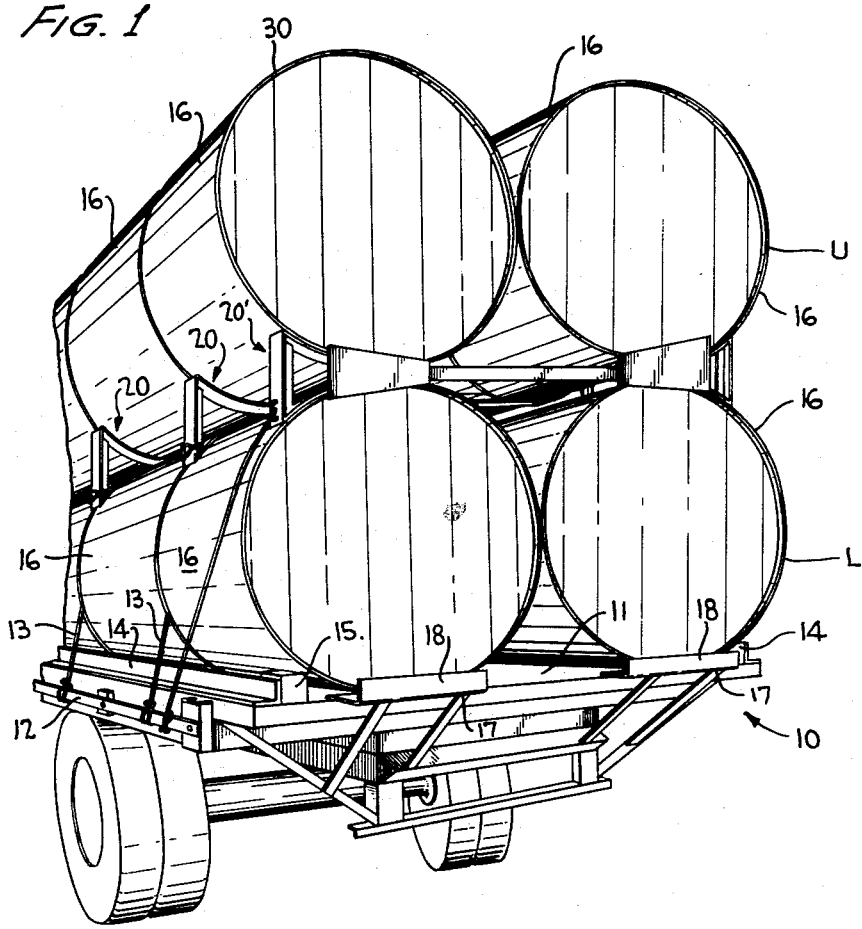
FIGURE 1 is a fragmentary perspective view of the rear end portion of a wheeled vehicle, showing the manner in which the cradles of the invention may be utilized to support a load of tobacco hogsheads thereon.

Referring now in detail to the accompanying drawings, the numeral 10 therein generally designates a conventional wheeled vehicle body of which only the rear end portion and the associated portion of the load carried thereby are shown. The body 10 exemplifies a generally conventional trailer structure, being provided with a flat and generally horizontal load carrying bed 11 provided on its opposite side edges with suitable load anchoring devices such as the usual longitudinally extending side rails, one of which is indicated at 12 in FIGURE 1. It will be seen that the rail 12 is fixed in laterally spaced relation to the load carrying bed 11 so that load securing or anchoring lines 13 may be readily tied thereto in accordance with usual practice. Fixedly supported on opposite sides of the bed 11 are the relatively spaced parallel vertical abutments 14 between which the load is disposed. These abutments which are provided by the upstanding flanges of angle iron fixedly secured to the bed 11, not only may function as means for laterally confining the load, but may also serve as back stops for positioning means such as the chock 15 which is wedged between one of the abutments and an adjacent hogshead or other cylindrical object 16 in FIGURE 1. While the presently most advantageous use of the invention is in connection with hogsheads, it is by no means restricted to this specific use, and accordingly the elements therein designated by the numeral 16 will be sometimes hereinafter referred to generically as cylinders or drums.

As will be seen by reference to FIGURE 1 the hogsheads or cylinders 16 are arranged on the vehicle bed 11 in upper and lower tiers, it being understood that the cylinders 16 are of uniform dimensions to facilitate their disposition in the manner hereinafter described. Each tier comprises a plurality, herein illustrated as a pair, of parallel and relatively horizontal rows of axially aligned hogsheds or cylinders. The several rows are coterminous, with the rows of cylinders in each tier in contiguous relationship and with the cylinders in each row respectively disposed abreast of those of the other rows. The lower tier generally designated by the letter L is supported on the flat bed 11 with the two parallel rows of cylinders 16 disposed longitudinally of the bed between the side flanges or abutments 14. It will be seen that means such as the chock 15 may be employed where desired to maintain the lower hogsheads of any given tier in peripheral engagement with each other, especially prior to formation of the upper tier U.

For preventing endwise or axial displacement of the hogsheads 16 there are provided conventional means such as the brackets 17 firmly affixed to the vehicle bed and affording upwardly projecting vertical ledges 18 respectively for abutting engagement with the hogsheads 16 at the axial ends of the respective rows constituting the lower tier L.

For supporting the cylinders or hogheads 16 of the upper tier U on and in vertical registry with those of the lower tier, there are provided a plurality of rigid cradles such as 20 and 20' respectively. These cradles extend horizontally between the upper and lower tiers transversely to the rows of cylinders in said tiers and at the respective axial ends of the cylinders 16. While all of the cradles may, if desired, be identical with the cradles 20 illustrated in FIGURES 2 and 3, it has been found possible to modify and somewhat simplify the end cradles 20', since these are required to coact with the hogshead on but one side thereof, whereas the intermediately located cradles 20 are adapted for cooperation with the adjoining axially presented ends of cylinders 16 on both sides thereof.

Referring now to FIGURES 2 and 3 for specific disclosure of the preferred structure of the cradles 20, it will be noted that the opposite ends of each such cradle constitute chocks or wedge portions 21—21 adapted for reception between the peripheries of the relatively vertically superimposed cylinders 16 from the relatively remote sides thereof, at the ends of the respective cylinders or hogsheads 16. These chocks 21—21 are fixedly maintained in a predetermined laterally spaced relation by the rigid medial portion or horizontal connecting portion 22 of each cradle. Each chock 21 is formed to provide both upwardly and downwardly presented chock surfaces 23 and 24 respectively. These surfaces 23 and 24 of each chock converge generally inwardly toward each other and preferably are curved in approximate conformity with the peripheries of the cylinders or hogsheads with which they are adapted to cooperate. Further, each such chock 21 includes vertical flanges 25 and 26 respectively which project above and below the upper and lower chock surfaces 23 and 24 for reception between the ends of the adjoining cylinders or hogsheads, of both the upper and the lower tiers U and L and for endwise positioning abutment with each of the cylinders 16 engaged thereby. Preferably the vertical flange 25 extends continuously along the cradle coextensively with the chocks and the interconnecting medial portion 22, whereby to lend rigidity to the structure to better support the weight of the upper tier of hogsheads U. It will be seen that the flanges 25 and 26 bisect the respective chock surfaces or supporting surfaces 23 and 24 respectively with which they are associated whereby portions of such surfaces will lie on opposite sides of each flange for operative engagement with the hogsheads similarly lying on opposite sides of the respective flanges or dividers 25 and 26.

Not only are the cradles 20 thus fixedly and accurately positioned with respect to the hogsheads, but in addition, the said flanges 25 and 26 respectively maintain uniform axial spaces between relatively aligned cylinders through which spaces there may be disposed the anchoring or securing lines 13, by means of which the laterally opposed ends of the respective cradles 20 are tied securely to the side rails such as 12 of the vehicle bed. The interposition of the flanges 26 between the hogsheads of the lower tier L will thus maintain a sufficient spacing at all times between such hogsheads as to prevent their pinching or severing the lines 13.

As will be readily apparent from FIGURES 2 and 3, the cradle 20 therein illustrated is fabricated primarily from commercially available angle iron stock it being apparent that the medial portion 22 and the upwardly presented chock surfaces 23 and flange 25 are defined by a pair of angle iron sections with their vertical flanges welded together to provide the vertical flange 25 and with the outer ends thereof curved upwardly to define the chock surfaces 23. The chock surfaces 24 similarly are constituted by the oppositely directed lateral flanges of curved lengths of angle irons, the vertical flanges of which are welded together in flush relationship to define the downwardly directed vertical flanges 26. The chock surfaces 24 and flanges 26 are fixedly supported with respect to the rest of the structure by means of a spacer pad 27 and the vertically disposed angle iron section or brace 28, these portions 27 and 28 respectively being welded or otherwise firmly secured to the parts which they interconnect.

The end cradle 20' illustrated in FIGURES 4 and 5 has its vertical flanges 25' and 26' disposed at one edge thereof only and wholly to one side of the chock or supporting surfaces 23' and 24'. In this instance the flanges 25' and 26' comprise the upper and lower edges respectively of a metal plate 29 which is welded to each chock portion 21' of the cradle in a vertical plane with such edges projecting above and below the respective chock surfaces 23' and 24'. In this instance the stock from which the cradle 20' is formed is free of outwardly projecting flanges as in the case of the structure illustrated in FIGURES 2 and 3, such flanges being supplied solely by the edges 25' and 26' of the plate 29.

In the operation of the invention, it will be readily apparent from the foregoing description that the cradles 20 and 20' provide a means for supporting a plurality of upper rows of cylinders in vertically superposed relation over a corresponding plurality of lower rows which in turn rest on the vehicle bed 11 and thus lend the vehicle a greater carrying capacity than has heretofore been possible with the cylinders or hogsheads loaded in pyramidal formation in accordance with usual practice. Moreover the downwardly turned or directed chock surfaces 24 and 24' at the outer ends of the respective cradles are urged against the peripheries of the underlying hogsheads or cylinders of the lower tier L by the weight of the upper tier U in such a manner that the resulting wedging action urges the laterally adjoining rows of lower cylinders into firm frictional peripheral engagement with each other to strongly resist any tendency of the lowermost tier of cylinders 16 to roll on the flat bed 11. The lateral spacing between the downwardly directed chock surfaces 24—24 of each cradle, and also between the upper chock surface 23—23 and 24—24 thereof, is slightly less than the minimum possible spacing between the corresponding peripheral surface portion of the two parallel contiguous cylinders above and below said surfaces, so that the cylinders will be urged together with their adjacent peripheries in firm frictional engagement. In other words in the specific arrangement illustrated, the lateral spacing between the centers of curvature of each pair of chock surfaces 23—23 and 24—24 will be slightly less than the distance between the axes of laterally adjoining contiguous cylinders. At the same time rolling of the uppermost cylinder 16 is prevented by the upwardly curved or relatively upwardly diverging surfaces 23 and 23' of the respective cradles.

The relative axial positioning of the individual cylinders 16 is maintained by the vertical flanges 25 and 25' in abutment with the respective ends of the cylinders. Where the cylinders 16 constitute conventional hogsheads such as are employed for shipping tobacco, the invention is particularly advantageous inasmuch as the flanges 25, 25' and 26, 26' accurately position each of the cradles so that its chocking or supporting surfaces 23, 23', 24 and 24' engage the hogshead only at locations on its encircling metal end rims, such as are designated by the reference characters 30 in FIGURE 1, thereby avoiding imposition of forces on the wooden staves of the respective hogsheads. Moreover as above mentioned, the cradles coact with the hogsheads or cylinders to provide and maintain axial spaces between the adjoining ends of such cylinders through which may be disposed the securing or anchoring lines such as 13, without danger of being pinched or severed.

In this application I have shown only the preferred embodiment of my invention, simply by way of illustration of the preferred mode of practicing the invention. However, I recognize that it is capable of other and different embodiments and that its several details may be modified in various ways all without departing from the invention. Accordingly the drawings and description herein are to be considered as merely exemplary in nature.

Having thus described my invention, I claim:

1. A hogshead cradle comprising a pair of chocks and a rigid horizontal connector member fixedly maintaining said chocks in laterally spaced relation, each said chock including upwardly and downwardly presented inclined chock surfaces disposed symmetrically to a horizontal plane of symmetry, with said upper and lower surfaces of the respective chocks converging toward each other, and means carried by each said cradle for abutting endwise engagement with the axially presented ends of hogsheads whose peripheries are operatively engaged by said chock surfaces.

2. A hogshead cradle comprising a pair of chocks and a rigid horizontal connector fixedly maintaining said chocks in laterally spaced relation, each said chock including upwardly and downwardly presented inclined chock surfaces, with said upper and lower surfaces of the respective chocks converging toward each other, and laterally extending flanges projecting vertically above and below the respective said surfaces of each chock in a common vertical plane.

3. A hogshead cradle as defined in claim 2, in which said flanges bisect the respective chock surfaces to leave portions of such surfaces on opposite sides of the respective flanges, whereby said flanges may extend between the axially adjoining ends of adjacent hogsheads while said chock surfaces peripherally engage the said hogsheads adjacent their respective ends.

4. Means for supporting upper and lower tiers of cylinders of uniform axial dimensions in vertically registering and laterally adjoining rows on a horizontal surface, comprising a plurality of rigid cradles extending horizontally between said upper and lower tiers transversely to the rows of cylinders therein and at the respective axial ends of said cylinders, each cradle comprising a pair of chocks disposed on the relatively remote sides of the respective vertically superposed rows of cylinders, and a rigid horizontal connector fixedly maintaining said chocks in laterally spaced relation, each said chock comprising upwardly and downwardly presented inclined chock surfaces converging generally inwardly toward the other said chock and in engagement with the peripheries of the respective cylinders, whereby the weight of the upper tier of said cylinders acts through the downwardly presented inclined chock surfaces of said cradle to urge the laterally adjoining cylinders of said lower tier into frictional peripheral engagement with each other and thus to secure them against lateral rolling movement, each chock remote from the ends of said rows of cylinders including vertical flanges which project above and below its respective upper and lower chock surfaces for disposition between the ends of adjoining cylinders, to position said chock surfaces for peripheral engagement with the said cylinders on opposite sides of said flanges.

5. Means for supporting upper and lower tiers of cylinders of uniform axial dimensions in vertically registering and laterally adjoining rows on a horizontal surface, comprising a plurality of rigid cradles extending horizontally between said upper and lower tiers transversely to the rows of cylinders therein and at the respective axial ends of said cylinders, each cradle comprising a pair of chocks disposed on the relatively remote sides of the respective vertically superposed rows of cylinders, and a rigid horizontal connector fixedly maintaining said chocks in laterally spaced relation, each said chock comprising upwardly and downwardly presented inclined chock surfaces converging generally inwardly toward the other said chock and in engagement with the peripheries of the respective cylinders, whereby the weight of the upper tier of said cylinders acts through the downwardly presented inclined chock surfaces of said cradle to urge the laterally adjoining cylinders of said lower tier into frictional peripheral engagement with each other and thus to secure them against lateral rolling movement, each said chock including vertical flanges in a common vertical plane projecting above and below its respective upper and lower chock surfaces, said flanges of some of the cradles extending vertically between and axially spacing said cylinders.

6. Means for supporting upper and lower tiers of cylinders of uniform axial dimensions in vertically registering and laterally adjoining rows on a horizontal surface, comprising a plurality of rigid cradles extending horizontally between said upper and lower tiers transversely to the rows of cylinders therein and at the respective axial ends of said cylinders, each cradle comprising a pair of chocks disposed on the relatively remote sides of the respective vertically superposed rows of cylinders, and a rigid horizontal connector fixedly maintaining said chocks in laterally spaced relation, each said chock comprising upwardly and downwardly presented inclined chock surfaces converging generally inwardly toward the other said chock and in engagement with the peripheries of the respective cylinders, whereby the weight of the upper tier of said cylinders acts through the downwardly presented inclined chock surfaces of said cradle to urge the laterally adjoining cylinders of said lower tier into frictional peripheral engagement with each other and thus to secure them against lateral rolling movement, each said chock including vertical flanges which project above and below its respective upper and lower chock surfaces in a common vertical plane, said flanges bisecting said chock surfaces in some of the cradles, located at the relatively adjoining ends of cylinders, whereby said flanges will extend between said adjoining ends for accurate axial positioning of the cradles with respect to said ends, with the said bisected surface portions on opposite sides of said flanges operatively engaging the peripheries of the respective cylinders.

References Cited by the Examiner

UNITED STATES PATENTS

| | | | |
|---|---|---|---|
| 1,088,980 | 3/1914 | Goble | 214—16.4 X |
| 2,588,278 | 3/1952 | Noerr | 214—10.5 |
| 2,593,472 | 4/1952 | McGinn | 214—10.5 |
| 2,611,495 | 9/1952 | Weaver | 214—10.5 |
| 2,817,304 | 12/1957 | Newcomer | 105—367 X |
| 3,019,916 | 2/1962 | Malcher | 214—10.5 |

GERALD M. FORLENZA, *Primary Examiner.*

MORRIS TEMIN, *Examiner.*